Patented July 16, 1946

2,404,096

UNITED STATES PATENT OFFICE 2,404,096

CHLORINATED METHYLENE-BIS-DIMETHYL HYDANTOIN

Arthur O. Rogers, Lewiston, N. Y., assignor to E. I. du Pont de Nemours & Company, Wilmington, Del., a corporation of Delaware No Drawing. Application March 27, 1943, Serial No. 480,852

4 Claims. (Cl. 260—309.5)

This invention relates to a new chlorine-containing compound, and to a method by which that compound may be prepared from readily available starting materials. More particularly, it relates to N,N'-dichloro(methylene-bis-dimethyl hydantoin), a solid product containing available chlorine, and to a method of preparing this compound from methylene-bis-dimethyl hydantoin.

Methylene-bis-dimethyl hydantoin is a chemical compound which may be readily prepared by reacting 5,5-dimethyl hydantoin with formaldehyde and hydrochloric acid. A convenient procedure for preparing this compound involves adding 5,5-dimethyl hydantoin to concentrated hydrochloric acid in which formaldehyde gas or paraformaldehyde has been dissolved. It is a white powder having a melting point of 295–296° C. and has the following probable structural formula:

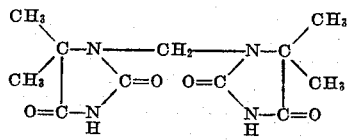

The empirical formula is $C_{11}H_{16}O_4N_4$.

Methylene-bis-dimethyl hydantoin and methods for preparing it are described and claimed in the copending application of Joseph Frederic Walker, Serial No. 434,436, filed March 12, 1942.

I have now found that certain novel chlorine-yielding compounds may be prepared by reacting chlorine with methylene-bis-dimethyl hydantoin in an aqueous solution which is alkaline in reaction. The resulting product, N,N'-dichloro-(methylene-bis-dimethyl hydantoin) is a solid product containing 21.05 per cent of active chlorine. It can be used in place of the hypochlorites or other chlorine-yielding chemicals, and is generally less water sensitive than those products. It is less reactive in moist air, and is characterized by low vapor pressure and high molecular weight.

In preparing the new chemical compound, methylene-bis-dimethyl hydantoin is dissolved in an aqueous alkaline solution. The solution may be rendered alkaline by the use of any basic material which does not have an adverse effect in breaking the ring structure of the starting material. We have utilized sodium carbonate with resultant high yields, but other basic materials such as lime, sodium hydroxide, sodium bicarbonate, etc., may also be used.

Gaseous chlorine is now passed into the aqueous alkaline solution containing the dissolved methylene-bis-dimethyl hydantoin. It may be pointed out that complete solution of the entire amount of the methylene-bis-dimethyl hydantoin is not necessary, and the reaction will proceed to completion even when there is present undissolved starting material. The amount of chlorine passed in should be regulated so that two atoms of chlorine are introduced into the methylene-bis-dimethyl hydantoin, replacing the two hydrogen atoms attached to the nitrogen atoms. This may involve testing samples of the product from time to time and determining its chlorine content, thereby insuring complete replacement of both hydrogen atoms by chlorine.

When the chlorination is substantially complete the product is filtered off and washed in distilled water. The filtrate may contain some unconverted starting material, and by passing chlorine into this filtrate additional amounts of the dichloro product may be recovered.

N,N'-dichloro-(methylene-bis-dimethyl hydantoin) is a distinct chemical compound having the following formula:

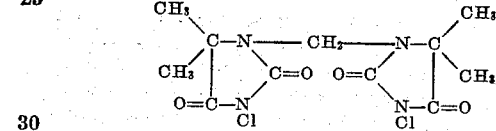

The equation representing the chemical reaction which occurs is as follows:

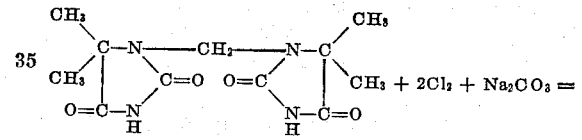

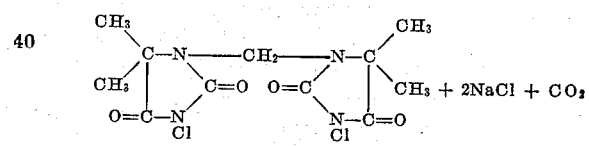

Proof of the structure of the new compound N,N'-dichloro-(methylene-bis-dimethyl hydantoin) involves first establishing the structure of the methylene-bis-dimethyl hydantoin starting material, and then the point of attachment of the two chlorine atoms introduced. Methylene-bis-dimethyl hydantoin is prepared from dimethyl hydantoin in accordance with the method described in the above-identified copending Walker application. Nitrogen determinations according to the Kjeldahl method prove the presence of four nitrogen atoms and confirm the empirical formula $C_{11}H_{16}O_4N_4$ for methylene-bis-dimethyl hydantoin. The structural formula of dimethyl hydantoin

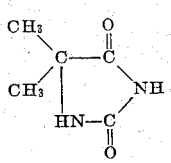

is of course well established. When two molecules of dimethyl hydantoin are joined by a methylene bridge, in accordance with the process disclosed in said Walker application, in order to produce methylene-bis-dimethyl hydantoin it is necessary first to locate the methylene bridge with reference to the two dimethyl hydantoin molecules joined.

Since only two of the original four NH groups present in the two molecules of dimethyl hydantoin are available when the methylene-bis-compound is later chlorinated, it is evident that the methylene linkage in methylene-bis-dimethyl hydantoin must be between nitrogen atoms. As the compound acts as a weak dibasic acid in the formation of salts, and is soluble in cold sodium hydroxide solution, this confirms the presence of two of the groups

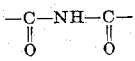

in which the NH radical is rendered acidic by the presence of the two adjacent carbonyl groups. The acidic characteristic of such compounds is illustrated by the acidic character of phthalimide, for example. If the methylene-bis-dimethyl hydantoin molecule were so constituted that the methylene bridge occurred between the nitrogen atoms of each dimethyl hydantoin ring structure which are positioned between the carbonyl groups, the compound would then not contain any

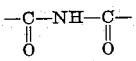

group and would not exhibit acidic properties. Compounds of this type prepared, for example, by the reaction of p-xylylene dichloride or tetramethylene dichloride with the sodium salt of dimethyl hydantoin do not exhibit such acidic properties and are not soluble in cold sodium hydroxide solutions. Obviously since methylene-bis-dimethyl hydantoin acts as a dibasic acid it must contain two of the groups

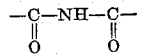

wherefrom it follows that the methylene bridge which connects the nitrogen atoms must be so positioned as to give the compound the structure,

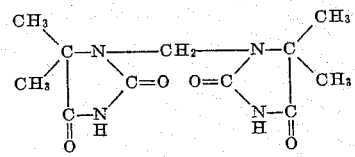

That the two chlorine atoms introduced are attached to nitrogen is evident since the chlorine is capable of liberating iodine from solutions containing the iodide ion in the proportion of two atoms of iodine per atom of chlorine. This behavior is determinative of N-chloro compounds (N-chloro phthalimide is illustrative) but not of compounds wherein the chlorine is attached to carbon. It is therefore evident that the new chemical compound N,N′-dichloromethylene-bis-dimethyl hydantoin must have the structural formula given above.

*Example*

An aqueous alkaline solution was prepared by dissolving 560 grams (5.28 mols) of sodium carbonate in 6720 cc. of distilled water. Methylene-bis-dimethyl hydantoin in the amount of 450 grams (1.678 mols) was then added, and the mixture heated to 35–40° C. in order to secure complete solution. During this period distilled water in the additional amount of 200 to 300 cc. was added.

The solution was filtered and placed in a reaction flask. The temperature was maintained at 35–40° C. and chlorine gas was passed in. At the end of one hour the supply of gas was cut off, and the precipitated product removed by filtration. This product was washed with 2–3 liters of distilled water and again filtered. The two filtrates were then brought together and further amounts of chlorine passed thereinto for about fifteen minutes. This resulted in the formation of an additional amount of product which precipitated in the liquid, this product being removed and washed as before.

The yield of dichloro-(methylene-bis-dimethyl hydantoin) was 526 grams or 92.7% of the theoretical. The product had an active chlorine content of 20.00% as determined by iodometric titration (96% of theoretical), and a melting point of 202–206° C.

Dichloro-(methylene-bis-dimethyl hydantoin) is a white powdery material having a characteristic odor. It is non-combustible and non-explosive, but decomposes at 250° C. with the evolution of chlorine. Its solubilities in various solvents at various temperatures are as follows:

|  | Per cent soluble | Temperature |
|---|---|---|
|  |  | °C. |
| Kerosene | Insoluble | 20 |
|  | 0.01 | 55 |
| Methylene chloride | 2.36 | 0 |
|  | 3.97 | 30 |
| Perchlorethylene | 0.015 | 26 |
| Sym.-dichlorethane | 0.415 | 26 |
| Carbon tetrachloride | 0.03 | 26 |
| Sym.-tetrachlorethane | 2.23 | 26 |
| Toluene | 0.161 | 26 |
| Methyl alcohol | 0.186 | 26 |
| Absolute ethyl alcohol | 0.093 | 26 |
| 1,4-dioxane | 4.2 | 25 |
| 1-nitropropane | 1.39 | 25 |
| Cyclohexanone | 3.08 | 25 |
| Nitrobenzene | 0.88 | 25 |
| Ethyl acetate | 1.13 | 25 |

The compound hydrolyzes in water yielding a solution containing from 28 to 30 parts per million of available chlorine. This solution is useful as an antiseptic and germicidal agent, and for various bleaching and decolorizing purposes. Solutions in inert solvents may be used for impregnating cloth or other fibrous material, or for other purposes.

I claim:

1. N,N′-dichloro-(methylene-bis-dimethyl hydantoin) having the formula:

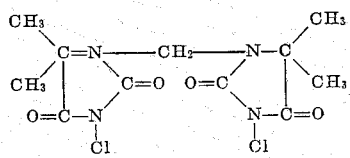

2. The method of preparing N,N′-dichloro- (methylene-bis-dimethyl hydantoin) having the formula:

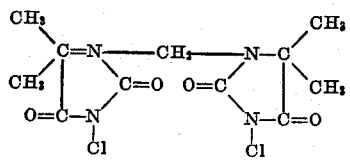

which comprises reacting chlorine with methylene-bis-dimethyl hydantoin in a dilute aqueous alkaline medium.

3. A white powdery material having the formula:

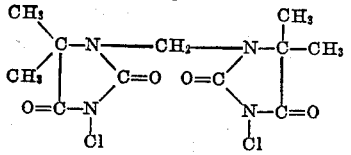

4. A white powdery material which melts at a temperature between 202° C. and 206° C., decomposes at a temperature of 250° C., hydrolyzes in water to yield a solution containing free chlorine, and has the empirical formula $C_{11}H_{14}O_4N_4Cl_2$

ARTHUR O. ROGERS.